(12) United States Patent
Celest

(10) Patent No.: US 12,466,576 B2
(45) Date of Patent: Nov. 11, 2025

(54) AIRCRAFT ATTITUDE DISPLAY SYSTEM AND METHOD

(71) Applicant: Frederick Celest, Henderson, NV (US)

(72) Inventor: Frederick Celest, Henderson, NV (US)

( * ) Notice: Subject to any disclaimer, the term of this patent is extended or adjusted under 35 U.S.C. 154(b) by 174 days.

(21) Appl. No.: 18/209,974

(22) Filed: Jun. 14, 2023

(65) Prior Publication Data

US 2024/0294267 A1    Sep. 5, 2024

Related U.S. Application Data

(60) Provisional application No. 63/450,067, filed on Mar. 5, 2023.

(51) Int. Cl.
| | | |
|---|---|---|
| *B64D 43/00* | (2006.01) | |
| *G06T 3/60* | (2024.01) | |
| *G06T 11/20* | (2006.01) | |

(52) U.S. Cl.
CPC ............... *B64D 43/00* (2013.01); *G06T 3/60* (2013.01); *G06T 11/203* (2013.01)

(58) Field of Classification Search
None
See application file for complete search history.

(56) References Cited

U.S. PATENT DOCUMENTS

| | | | |
|---|---|---|---|
| 2017/0183103 A1 | 6/2017 | Monvoisin et al. | |
| 2019/0056901 A1* | 2/2019 | He | G06F 3/147 |
| 2020/0386573 A1* | 12/2020 | Lin | G05D 1/0808 |

* cited by examiner

*Primary Examiner* — Matthew Ell
*Assistant Examiner* — David V Luu
(74) *Attorney, Agent, or Firm* — QuickPatents; Kevin Prince

(57) ABSTRACT

An attitude display system for use in an aircraft has at least one display unit visible by a pilot within a cockpit. A symbology generator is configured for receiving input from at least one attitude sensor and generating symbology image data representative of a pear-shaped attitude indicator, distorted vertically to represent a pitch of the aircraft and rotated to represent a roll angle of the aircraft. The symbology generator may further be configured for adding a horizontal line that represents a horizon, a regular trapezoid representing a downward gravity vector at a base of the trapezoid, a pitch angle of the aircraft, split wings representing an angle of attack of the aircraft, and a stall warning in a sawtooth crack shape. A tail portion of a T-shape with the curved top edge is itself curved in a direction opposite that of an aircraft spin direction.

24 Claims, 12 Drawing Sheets

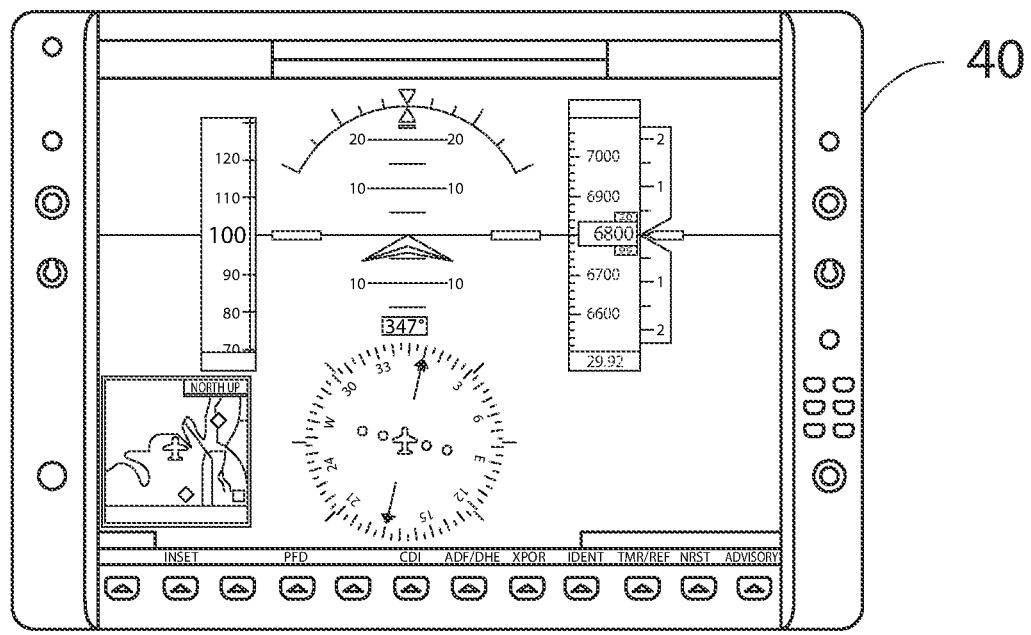
FIG. 1A
(PRIOR ART)
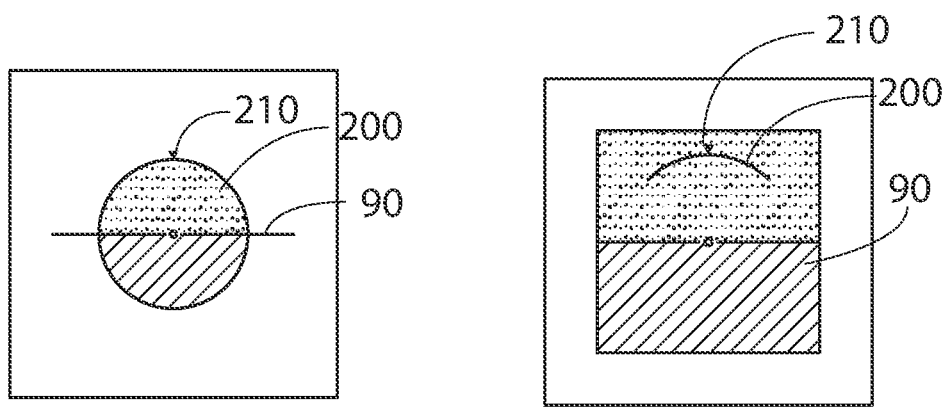
FIG. 1B
(PRIOR ART)
FIG. 1C
(PRIOR ART)

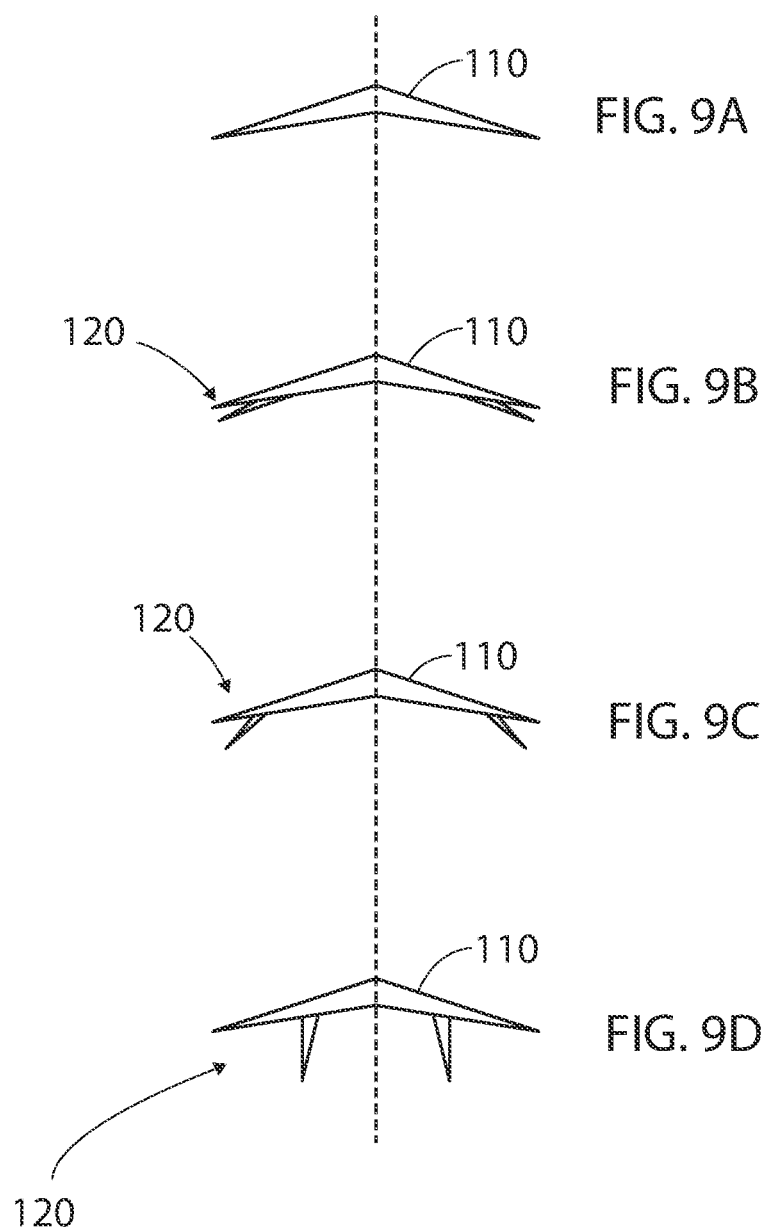

AIRCRAFT ATTITUDE DISPLAY SYSTEM AND METHOD

CROSS-REFERENCE TO RELATED APPLICATIONS

This application claims the benefit of U.S. Provisional Patent Application No. 63/450,067, filed on Mar. 5, 2023, and is incorporated herein by reference.

STATEMENT REGARDING FEDERALLY SPONSORED RESEARCH AND DEVELOPMENT

Not Applicable.

FIELD OF THE INVENTION

This invention relates to aircraft instrumentation, and more particularly to a pear-shaped attitude indicator.

BACKGROUND

An aircraft's attitude indicator is an instrument that uses a gyroscope or the equivalent, maintaining rigidity in space, hence keeping the indicator always level with the horizon when set properly. The gyroscope, via mechanical links, erects a level indicator display for a pilot to see and interpret. The pilot after watching and interpreting the display knows the attitude in space of the aircraft and can therefore maintain control without visual reference to the outside horizon.

After the initial single color attitude indicators of the 1940s, the attitude indictor display was enhanced with a two-color system, blue for the sky above the horizon line, and brown for the earth below the horizon line. In the 1990s-2000s, digital attitude instrument display started to become more common. Also, electronic solid-state attitude sensors began replacing mechanical gyros. Even with the digitization of the instrument, the interface-display essentially kept the same geometry and symbology. The only difference was in a square shape for the display instead of the traditional round display.

These technological improvements brought no improvement in the effectiveness of the symbology. The added benefit of going digital was mainly in the addition of other information on a single screen. In the 2010s-2020s the digital screen became bigger to display even more information, but the attitude indicator symbology remained the same.

Military aviation has added requirements. A military pilot must look outside to scan for enemies. This led to the creation of the Head Up Display (HUD) and later the Helmet Mounted Display (HMD), both of which include at least one transparent window or visor with attitude indication projected on it. The HUD and HMD devices project a green monochrome horizon line and attitude 'wings' on the internal side of the windshield.

There is no other color. The quadrants above and below the horizon line only have degrees of pitch lines.

With such displays, the pilot's attitude awareness is slightly reduced because of the monochromatic symbology. If the pilot wants a more accurate indication of his attitude with respect to a ground surface, he must look at a physical or digital attitude instrument inside the cockpit.

By looking at the display of the attitude indicator since its inception, very little has changed. Essentially the attitude display uses the 'circle' or earth symbology and a nose pointer. Flying only by instruments is one of the most difficult tasks a pilot has to do. Novice pilots spend a considerable amount of time learning how to fly without references to external visual cues and that skill must be maintained throughout a pilot's career. Additionally, the biggest cause of accidents today is Loss of Control (LOC) in flight. Attitude awareness is of utmost importance to prevent LOC.

One drawback with the circle shape that is generally used in prior art devices is that when there is a change of angle the shape remains the same. The pilot must interpret the colors and/or read the line of angles of pitch if there are no colors like on a HUD/HMD, thereby loosing reaction time and also loosing critical thinking bandwidth needed in mental processing of overloading situations.

Therefore, there is a need for a device that presents a more intuitive symbology for representing attitude of the aircraft, in terms of pitch and roll. Such a needed system would be easy to implement technically on new and existing aircraft, and would present several intuitive measurements for parameters such as angle of attack, stall warnings, spin warnings during a LOC event, slip/skid indication. The present invention accomplishes these objectives.

SUMMARY OF THE INVENTION

The present device is an attitude display system of the present invention for use in a cockpit of an aircraft by a pilot. The aircraft has at least one display unit visible by the pilot within the cockpit. A symbology generator is configured for receiving input from at least one attitude sensor, and generating symbology image data representative of a pear-shaped attitude indicator, distorted vertically to represent a pitch of the aircraft and rotated to represent a roll angle of the aircraft. The pear-shaped attitude indicator has a thin upper neck area and a thicker base area. The symbology generator provides the symbology image data to the at least one display unit.

The symbology generator may further be configured for adding a horizontal line that represents a horizon. In such an embodiment the location of the pear-shaped attitude indicator with respect to the horizon line represents the pitch angle α of the aircraft. Further, the symbology generator may be configured for adding to the display a regular trapezoid representing a downward gravity vector at a base of the trapezoid. The pear-shaped attitude indicator preferably widens at the base area as the nose down pitch of the aircraft increases, and preferably narrows at the thin upper neck area as the nose up pitch increases.

Preferably the symbology generator is configured for generating symbology image data representative of the pitch angle α of the aircraft, and for generating symbology image data representative of the aircraft as a chevron shape centered within the at least one display unit. Such a chevron shape may further include split wings representing an angle of attack of the aircraft. The greater the angle of attack α, the larger the split in the split wings.

As the aircraft approaches a critical angle of attack of between 81% and 86% (of critical angle of attached), alternately represented as an angle of attack of between. and, the chevron shape may include a sawtooth crack shape, warning the pilot of an impending stall of the aircraft. Once stalled, the symbology generator generates symbology image data representative of the aircraft as a T-shape having a curved top edge with the sawtooth crack shape. A tail portion of the T-shape with the curved top edge is itself curved in a direction opposite that of an aircraft spin direction. As such, the pilot can quickly see what is wrong with the aircraft and compensate for the spin immediately.

Preferably a slip/skid indicator can be included in the symbology image data generated by the symbology generator, such as a triangle/trapeze type of slip/skid indicator, or a ball/bars type slip/skid indicator.

The present invention is a system that presents a more intuitive symbology for representing attitude of the aircraft, in terms of pitch and roll, to a pilot. The present system is easy to implement technically on new and existing aircraft, and presents several intuitive, quickly-discerned measurements for parameters such as angle of attack, stall warnings, spin warnings during a LOC event, slip/skid indication. Other features and advantages of the present invention will become apparent from the following more detailed description, taken in conjunction with the accompanying drawings, which illustrate, by way of example, the principles of the invention.

DESCRIPTION OF THE DRAWINGS

FIG. 1A is a front elevational view of a prior art attitude display unit;

FIG. 1B is a front elevational view of a prior art symbol display for aircraft attitude;

FIG. 1C is a front elevational view of an alternate prior art symbol display for aircraft attitude;

FIG. 9A is a diagram of a chevron shape representative of the aircraft on the attitude display;

FIG. 9B is a diagram of the chevron of FIG. 9A, but showing Angle Of Attack of about 20% of stall angle, represented by a split wing symbol;

FIG. 9C is a diagram of the chevron of FIG. 9A, but showing an Angle Of Attack of about 85% of stall angle, represented by the split wing symbol;

FIG. 9D is a diagram of the chevron of FIG. 9A but showing a pitch angle of about 85-degrees represented by the split wing symbol;

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid 13 unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 2A:
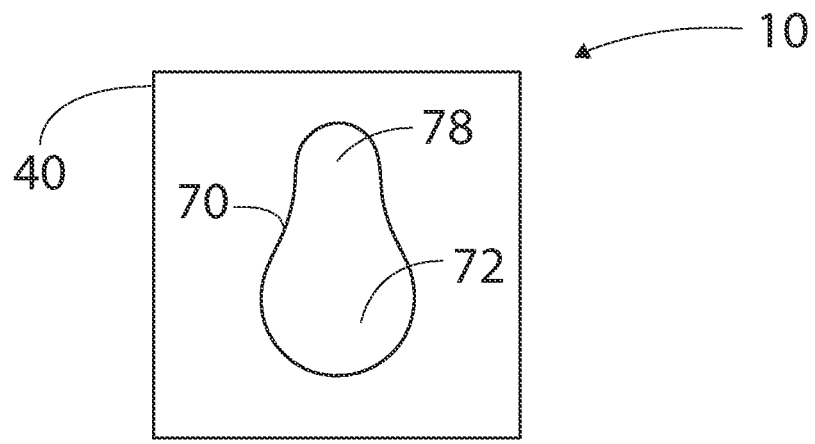
FIG. 2A is a front elevational view of a pear-shaped attitude display symbol of the present invention.
Figure 2B:
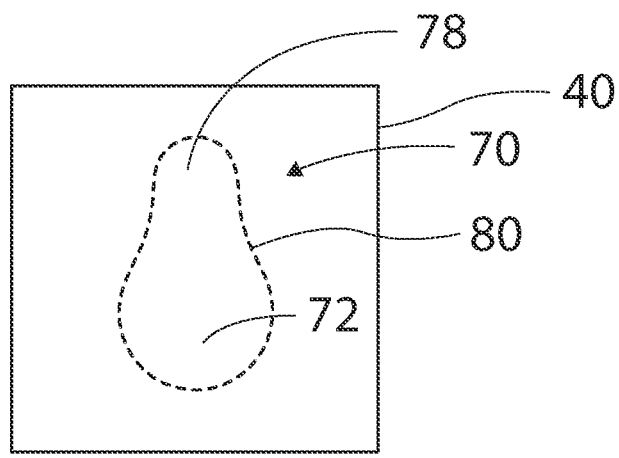
FIG. 2B is a front elevational view of the pear-shaped attitude display symbol of FIG. 2A but drawn with broken lines.
Figure 2C:
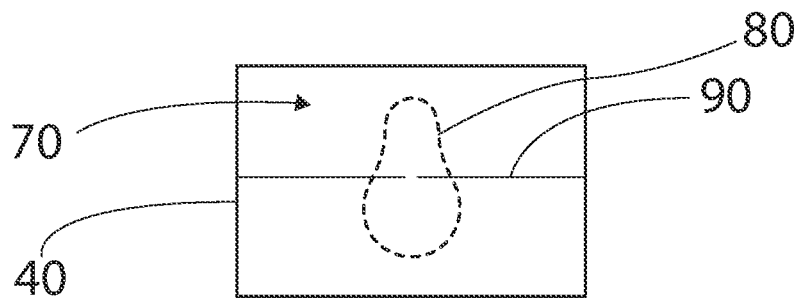
FIG. 2C is a front elevational view of the pear-shaped attitude display symbol of FIG. 2A and further including a horizontal horizon line representing a horizon.
Figure 3A:
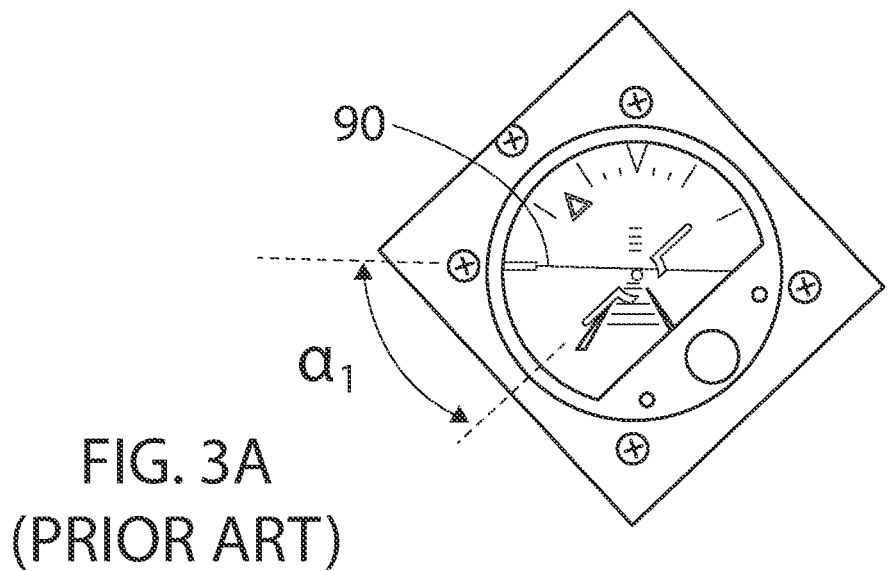
FIG. 3A is a front elevational view of a prior art attitude display showing a 45-degree bank with level flight.
Figure 3B:
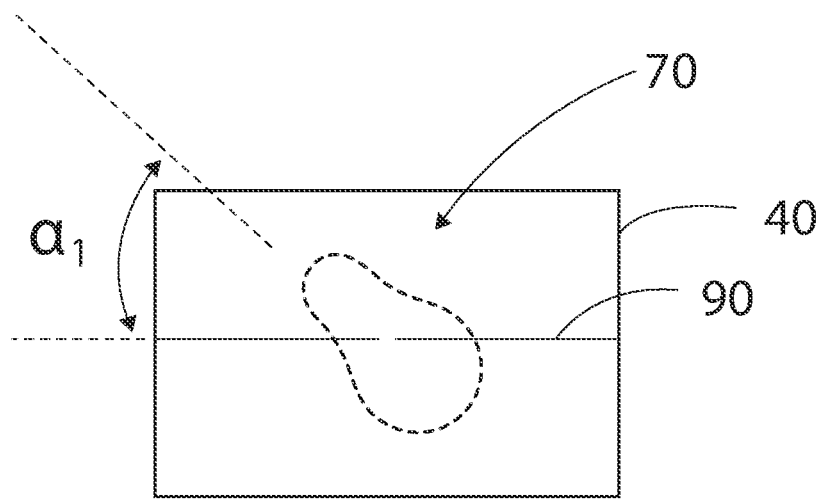
FIG. 3B is a front elevational view of an attitude display of the present invention, showing a 45-degree bank with level flight.
Figure 4:
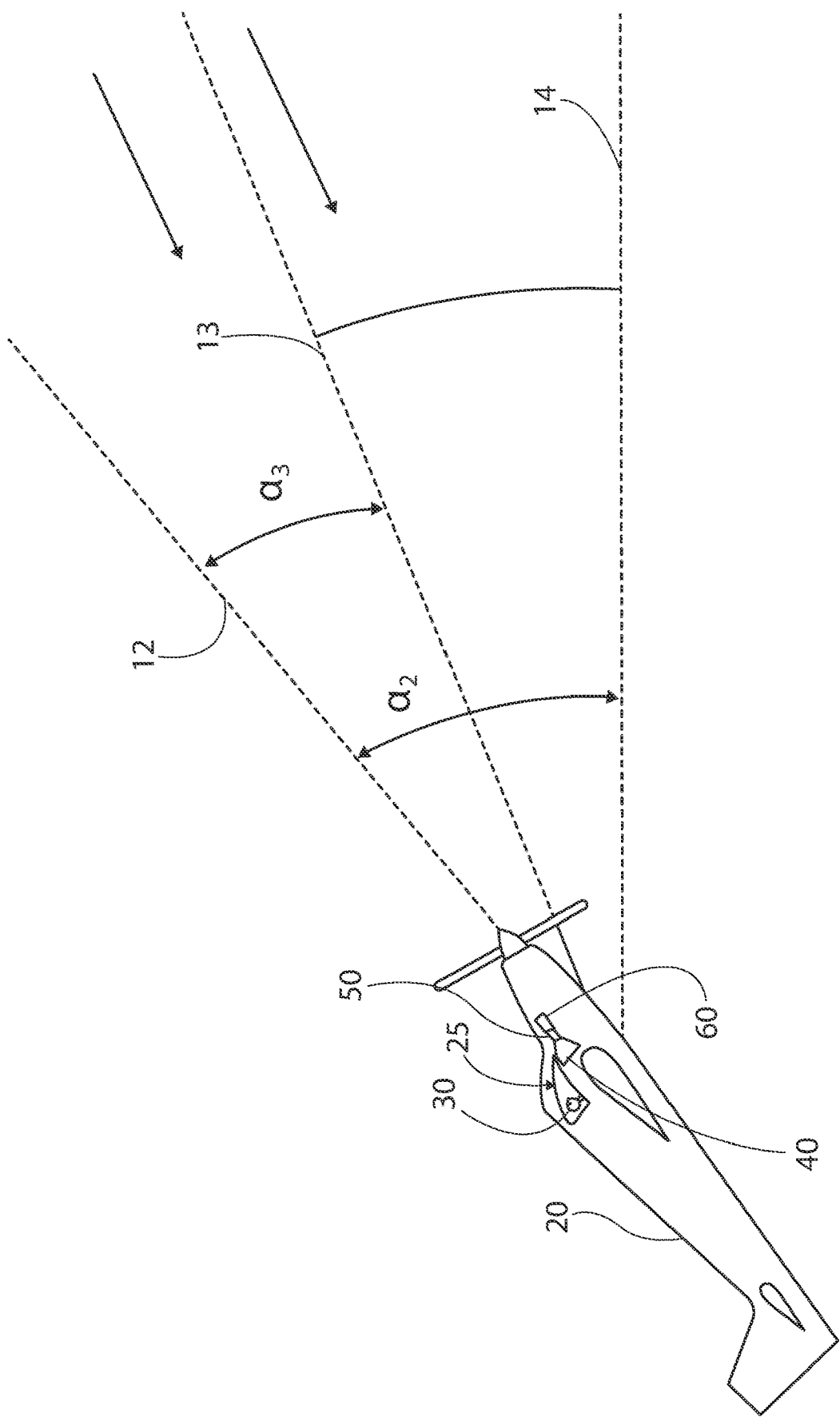
FIG. 4 is a side elevational diagram of an aircraft showing a representation of aircraft pitch and angle of attack.
Figure 5A:
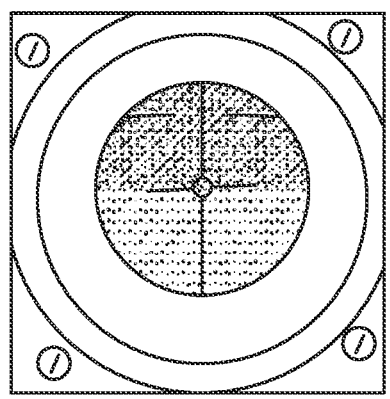
FIG. 5A is a front elevational view of a prior art attitude display showing an inverted aircraft.
Figure 5B:
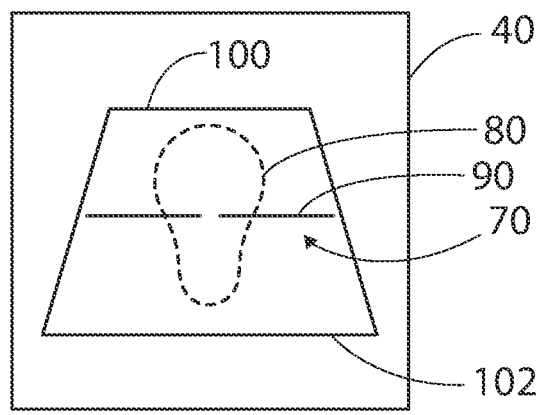
FIG. 5B is a front elevational view of the attitude display of the present invention, showing the inverted aircraft.
Figure 6A:
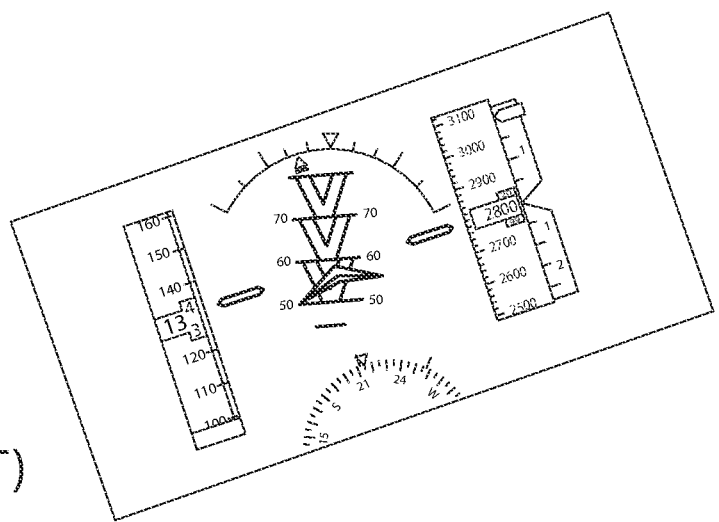
FIG. 6A is a front elevational view of a prior art attitude display showing a 58-degree nose-up pitch, slightly banking left.
Figure 6B:
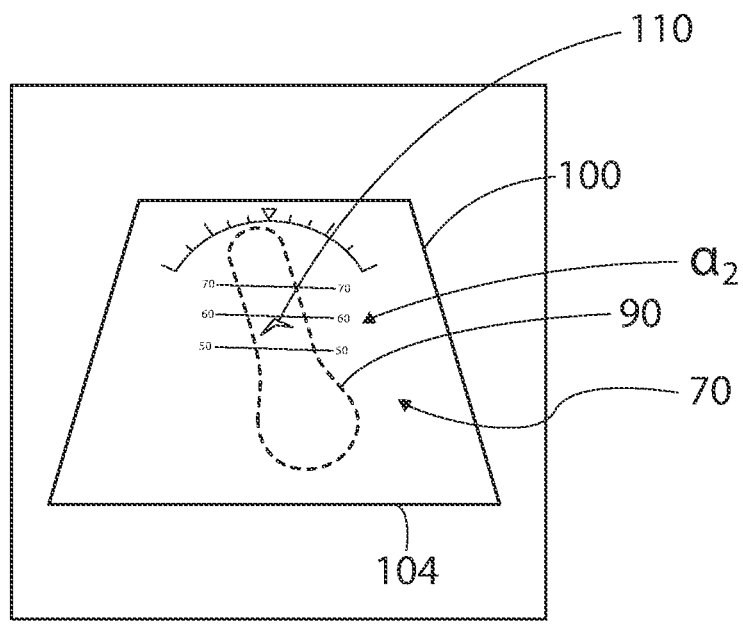
FIG. 6B is a front elevational view of the attitude display of the present invention, showing a 58-degree nose-up pitch, slightly banking left.
Figure 7A:
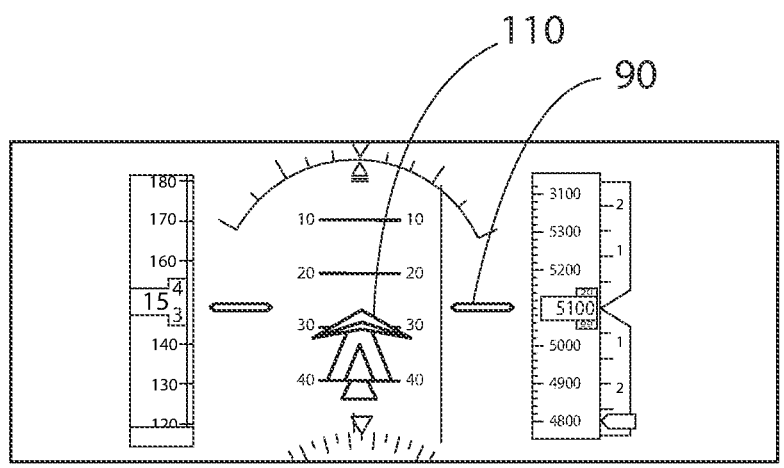
FIG. 7A is a front elevational view of a prior art attitude display showing a 27-degree nose-down pitch, with level flight.
Figure 7B:
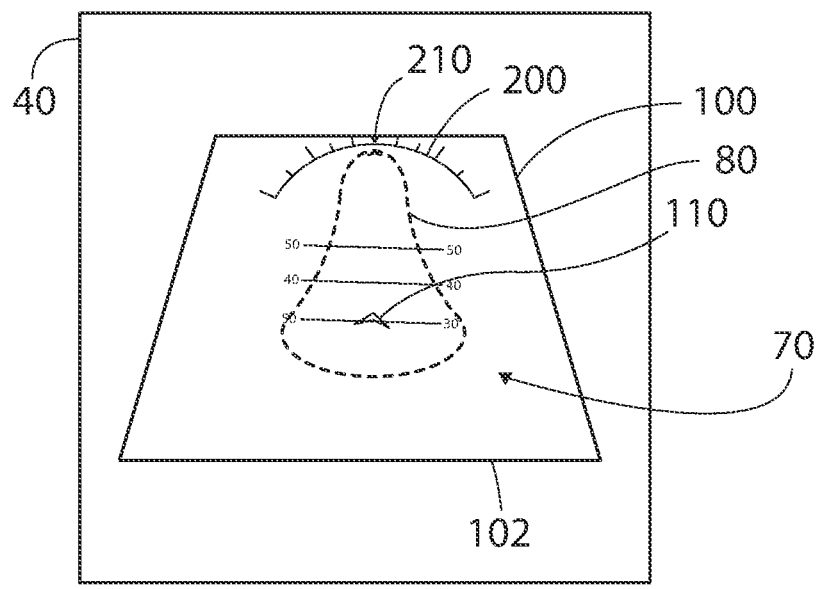
FIG. 7B is a front elevational view of the attitude display of the present invention, showing a 27-degree nose-down pitch, with level flight.
Figure 7C:
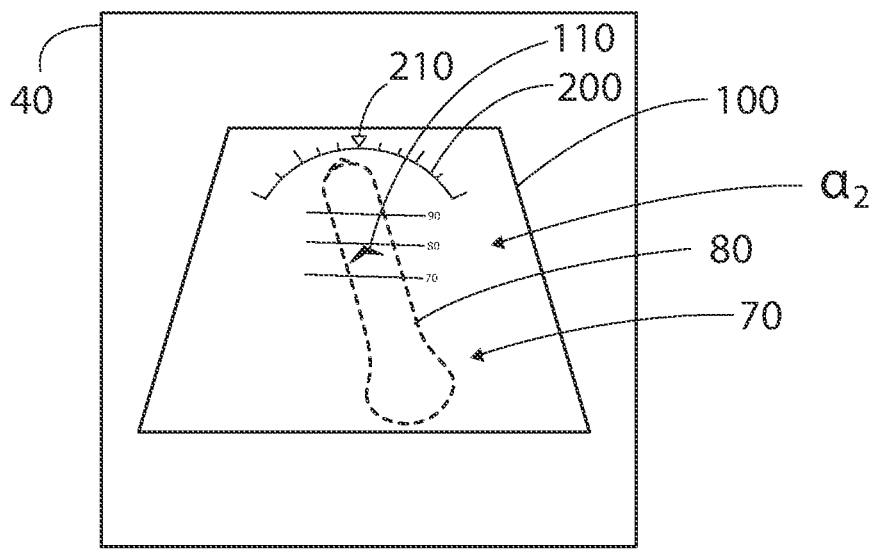
FIG. 7C is a front elevational view of the attitude display of the present invention, showing a 75-degree nose-up pitch, slightly banking left.
Figure 8A:
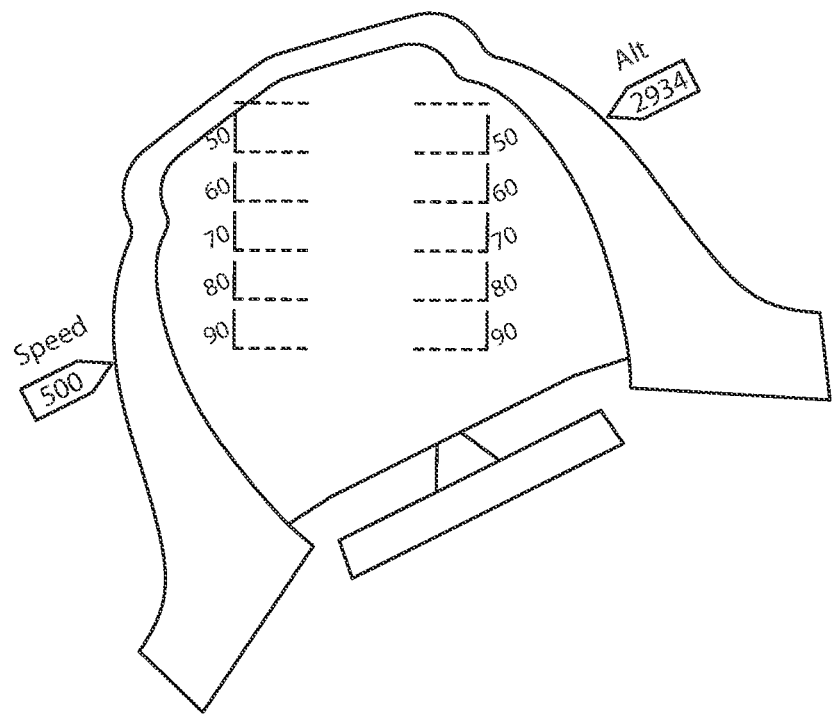
FIG. 8A is a front elevational view of a prior art attitude display, showing a 70-degree nose-down pitch with a 30-degree left bank.
Figure 8B:
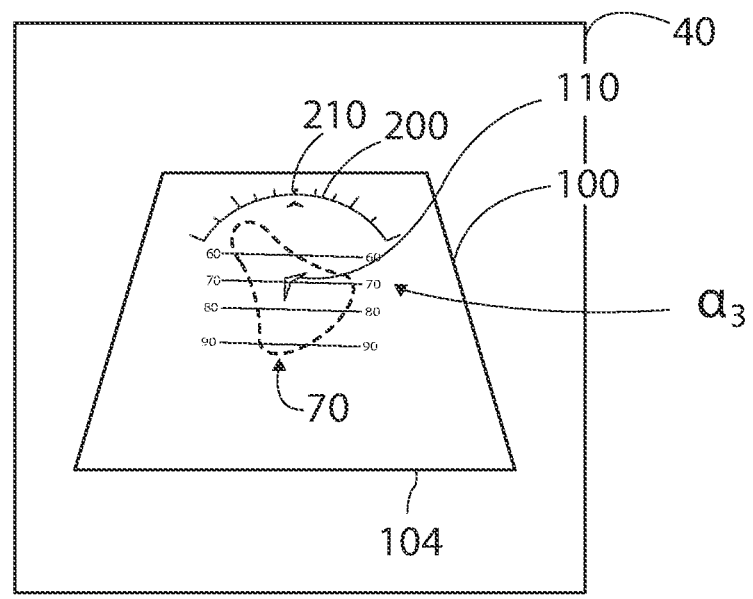
FIG. 8B is a front elevational view of the attitude display of the present invention, showing a 70-degree nose-down pitch with a 30-degree left bank.

FIGS. 1A-1C illustrate prior art aircraft attitude indicators and symbology, which has changed little since the inception of such devices in the 1940s. The pitch of an aircraft 20 (FIG. 4), represented by $\alpha_2$, relates to the angle between a longitudinal axis 12 of the 9 aircraft 20 and a horizontal axis 14. A pitch down angle indicates that a nose of the aircraft 20 is pointed below the horizontal axis 14, and a pitch up angle indicates that the nose of the aircraft 20 is pointed above the horizontal axis 14. The roll of an aircraft indicates an angle $\alpha_1$ of a longitudinal axis through wings of the aircraft 20 with respect to the horizontal axis. For example, FIG. 3A illustrates a prior art attitude display showing a roll angle $\alpha_1$ of about 45-degrees to the left.

FIGS. 2A-4 illustrate an attitude display system 10 of the present invention for use in a cockpit 25 of an aircraft 20 by a pilot 30. The aircraft 20 has at least one display unit 40 visible by the pilot 30 within the cockpit 25.

A symbology generator 50 is configured for receiving input from at least one attitude sensor 60, and generating symbology image data representative of a pear-shaped attitude indicator 70, distorted vertically to represent a pitch of the aircraft 20 and rotated to represent a roll angle of the aircraft 20. The pear-shaped attitude indicator 70 has a thin upper neck area 78 and a thicker base area 72. The symbology generator 50 provides the symbology image data to the at least one display unit 40. Preferably the pear-shaped attitude indicator 70 is represented in broken lines 80 (FIG. B), which represents a similar condition of the aircraft 20 as shown in the prior art display of FIG. 3A.

The symbology generator 50 may further be configured for adding a horizontal line 90 that represents a horizon. In such an embodiment the location of the pear-shaped attitude indicator 70 with respect to the horizon line 90 represents the pitch angle $\alpha_2$ of the aircraft 20. Further, the symbology generator 50 may be configured for adding to the display 40 a regular trapezoid 100 representing a downward gravity vector at a base 102 of the trapezoid 100. The pear-shaped attitude indicator 70 preferably widens at the base area 72 as the nose down pitch of the aircraft 20 increases, and preferably narrows at the thin upper neck area 78 as the nose up pitch increases.

Preferably the symbology generator 50 is configured for generating symbology image data representative of the pitch angle $\alpha_2$ of the aircraft 20 (FIGS. 5A-8B), and for generating symbology image data representative of the aircraft 20 as a chevron shape 110 centered within the at least one display unit 40. Such a chevron shape 110 may further include split wings 120 representing an angle of attack of the aircraft 20. The greater the angle of attack, the larger the split in the split wings 120 (FIGS. 9A-9D).

Figure 10A:
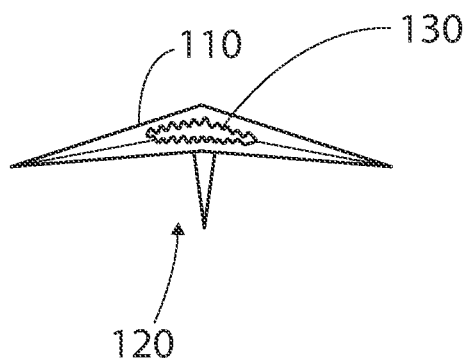
FIG. 10A is a diagram of the chevron of FIG. 9D but showing a sawtooth crack shape representing a critical angle of attack.
Figure 10B:
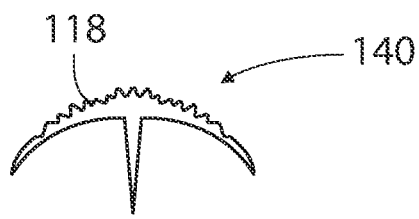
FIG. 10B is a diagram of the chevron of FIG. 10A but showing a T-shape with a curved top edge having the sawtooth crack shape, representing a stall of the aircraft.
Figure 10C:
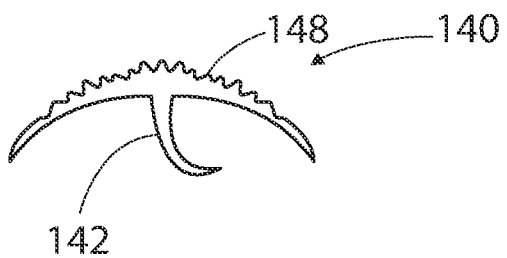
FIG. 10C is a diagram of the chevron of FIG. 10B but showing the T-shape with a tail portion curved in a direction opposite of that of an aircraft spin direction.
Figure 11:
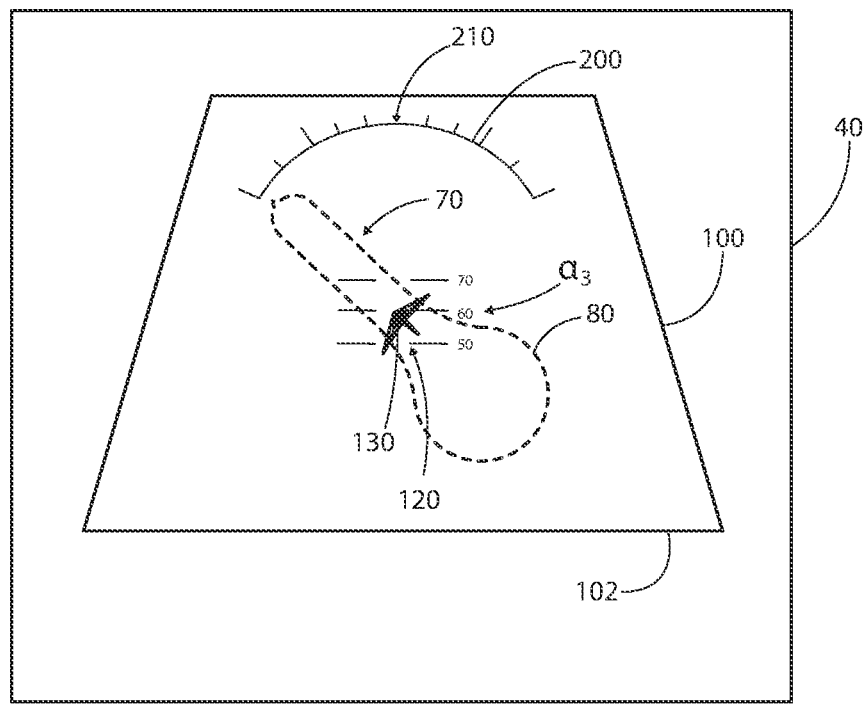
FIG. 11 is a diagram of the chevron of FIG. 9A but showing a pitch angle of about 60-degrees represented and a left bank angle of about 45-degrees, further showing the sawtooth crack shape indicative of an impending stall of the aircraft.

As the aircraft 20 approaches a critical angle of attack of between 81% and 86% of critical angle of attack, alternately represented as an angle of attack of between 0.9 and 0.95, the chevron shape 110 may include a sawtooth crack shape 130 (FIG. 10A), warning the pilot 30 of an impending stall of the aircraft 20. Once stalled, the symbology generator 50 generates symbology image data representative of the aircraft 20 as a T-shape 140 having a curved top edge 148 (FIG. 10B) with the sawtooth crack shape 130. A tail portion 142 of the T-shape 140 with the curved top edge 148 is itself curved (FIG. 10C) in a direction opposite that of an aircraft spin direction. As such, the pilot 30 can quickly see what is wrong with the aircraft 20 and compensate for the spin immediately.

Figure 12:
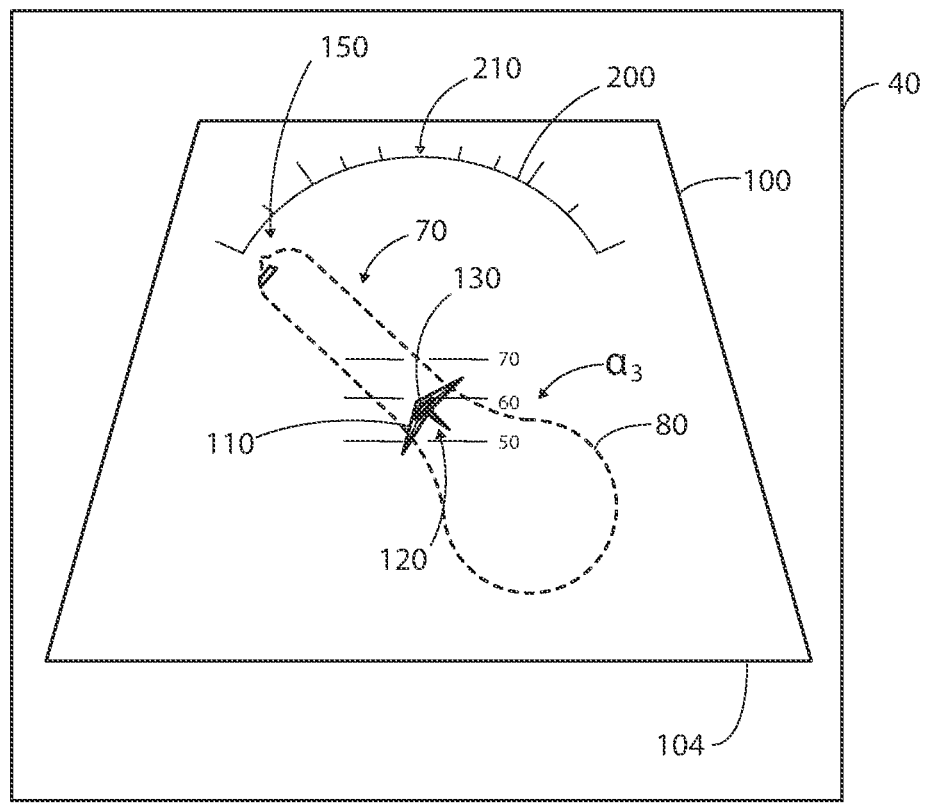
FIG. 12 is a diagram of the chevron of FIG. 11, further showing a triangle/trapeze type slip/skid indicator.
Figure 13:
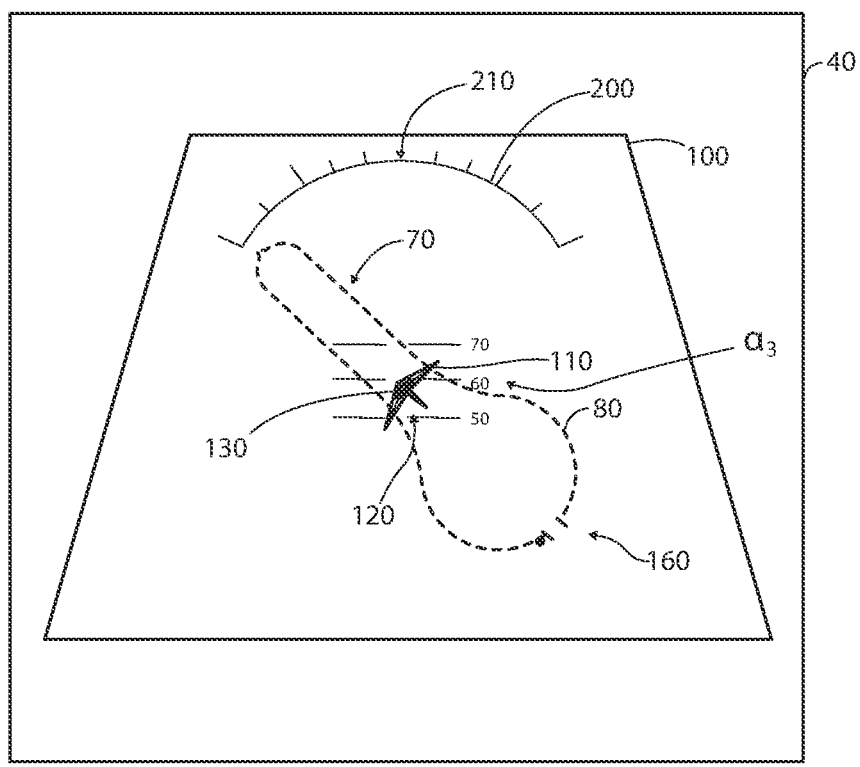
FIG. 13 is a diagram of the chevron of FIG. 11, further showing a ball/bars type slip/skid indicator.

Preferably a slip/skid indicator can be included in the symbology image data generated by the symbology generator 50, such as a triangle/trapeze type of slip/skid indicator 150 (FIG. 12), or a ball/bars type slip/skid indicator 160 (FIG. 13).

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An attitude display system for use in a cockpit of an aircraft by a pilot, comprising:
    at least one display unit visible by the pilot within the cockpit;
    a symbology generator operatively coupled to the at least one display unit and configured for
        receiving input from at least one attitude sensor;
        generating symbology image data representative of a pear-shaped attitude indicator distorted vertically to represent a pitch of the aircraft and rotated to represent a roll angle of the aircraft, the pear-shaped attitude indicator having a thin upper neck area and a thicker base area;
        providing the symbology image data to the at least one display unit;

wherein the symbology generator is configured for generating the symbology image data representative of the pear-shaped attitude indicator being wider at the base area when the pitch of the aircraft is nose down, the base area becoming wider as the nose down pitch increases; and wherein the symbology generator is configured for generating the symbology image data representative of the pear-shaped attitude indicator being narrower at the neck area when the pitch of the aircraft is nose up, the neck area becoming thinner as the nose up pitch increases.

2. The attitude display system of claim 1 wherein the symbology generator is configured for generating the symbology image data representative of the pear-shaped attitude indicator in broken lines.

3. The attitude display system of claim 1 wherein the symbology generator is configured for generating the symbology image data representative of the pear-shaped attitude indicator in front of a horizontal line representing a horizon, the location of the pear-shaped attitude indicator with respect to the horizon line representing the pitch of the aircraft.

4. The attitude display system of claim 1 wherein the symbology generator is configured for generating the symbology image data representative of the pear-shaped attitude indicator in front of a regular trapezoid representing a downward gravity vector at a base of the trapezoid.

5. The attitude display system of claim 1 wherein the symbology generator is configured for generating symbology image data representative of a pitch angle of the aircraft.

6. The attitude display system of claim 1 wherein the symbology generator is configured for generating symbology image data representative of the aircraft as a chevron shape centered within the at least one display unit.

7. The attitude display system of claim 6 wherein the symbology generator is configured for generating symbology image data representative of the aircraft as a chevron shape having split wings at an angle representing an angle of attack of the aircraft, the greater the angle of attack the larger the split in the wings.

8. The attitude display system of claim 7 wherein the symbology generator is configured for generating symbology image data representative of the aircraft as a chevron shape having a sawtooth crack shape as the aircraft approaches a critical angle of attack of between 0.90 to 0.95.

9. The attitude display system of claim 8 wherein the symbology generator is configured for generating symbology image data representative of the aircraft as a T-shape with a curved top edge and having a sawtooth crack shape when the aircraft has stalled.

10. The attitude display system of claim 9 wherein a tail portion of the T-shape with the curved top edge is itself curved in a direction opposite that of aircraft spin.

11. The attitude display system of claim 7 wherein the symbology generator is configured for generating symbology image data representative of the aircraft including a triangle/trapeze type slip/skid indicator.

12. The attitude display system of claim 7 wherein the symbology generator is configured for generating symbology image data representative of the aircraft including a ball/bars type slip/skid indicator.

13. A method of displaying attitude information to a pilot in a cockpit of an aircraft, comprising the steps:
providing at least one display unit visible by the pilot within the cockpit that includes a symbology generator operatively coupled to the at least one display unit;
the symbology generator receiving input from the at least one attitude sensor of the aircraft;
the symbology generator generating symbology image data representative of a pear-shaped attitude indicator distorted vertically to represent a pitch of the aircraft and rotated to represent a roll angle of the aircraft, the pear-shaped attitude indicator having a thin upper neck area and a thicker base area;
the symbology generator generating the symbology image data representative of the pear-shaped attitude indicator being wider at the base area when the pitch of the aircraft is nose down, the base area becoming wider as the nose down pitch increases;
the symbology generator generating the symbology image data representative of the pear-shaped attitude indicator being narrower at neck area when the pitch of the aircraft is nose up, the neck area becoming thinner as the nose up pitch increases; and
the symbology generator providing the symbology image data to the at least one display unit.

14. The method of claim 13 further including the step:
the symbology generator generating the symbology image data representative of the pear-shaped attitude indicator in broken lines.

15. The method of claim 13 further including the step:
the symbology generator generating the symbology image data representative of the pear-shaped attitude indicator in front of a horizontal line representing a horizon, the location of the pear-shaped attitude indicator with respect to the horizon line representing the pitch of the aircraft.

16. The method of claim 13 further including the step:
the symbology generator generating the symbology image data representative of the pear-shaped attitude indicator in front of a regular trapezoid representing a downward gravity vector at a base of the trapezoid.

17. The method of claim 13 further including the step:
the symbology generator generating symbology image data representative of a pitch angle of the aircraft.

18. The method of claim 13 further including the step:
the symbology generator generating symbology image data representative of the aircraft as a chevron shape having split wings at an angle representing an angle of attack of the aircraft, the greater the angle of attack the larger the split in the wings.

19. The method of claim 18 further including the step:
the symbology generator generating symbology image data representative of the aircraft as a chevron shape having a sawtooth crack shape as the aircraft approaches a critical angle of attack of between 0.90 to 0.95.

20. The method of claim 19 further including the step:
the symbology generator generating symbology image data representative of the aircraft as a T-shape with a curved top edge and having a sawtooth crack shape when the aircraft has stalled.

21. The method of claim 20 further including the step:
a tail portion of the T-shape with the curved top edge being itself curved in an opposite direction of an aircraft spin.

22. The method of claim 13 further including the step:
the symbology generator generating symbology image data representative of the aircraft including a triangle/trapeze type slip/skid indicator.

23. The method of claim 13 further including the step:
the symbology generator generating symbology image data representative of the aircraft including a ball/bars type slip/skid indicator.

24. The method of claim 13 further including the step:
the symbology generator generating symbology image data representative of the aircraft as a chevron shape centered within the at least one display unit.

\* \* \* \* \*